(12) United States Patent
Cheng et al.

(10) Patent No.: US 8,245,193 B2
(45) Date of Patent: Aug. 14, 2012

(54) AUTOMATIC CREATIVE PROPOSAL GENERATING AND FILTERING SYSTEM AND MANUFACTURING METHOD THEREOF AND MULTIPLE COMPONENTS COMBINING METHOD

(75) Inventors: Chun-Fang Cheng, Taipei (TW); Geng-Shin Shen, Hsinchu (TW); Hui-Chung Che, Taipei (TW); Hou-Bai Lee, Taipei (TW)

(73) Assignees: Chipmos Technologies Inc, Hsinchu (TW); Gainia Intellectual Asset Services, Inc, Taipei (TW)

( * ) Notice: Subject to any disclaimer, the term of this patent is extended or adjusted under 35 U.S.C. 154(b) by 1128 days.

(21) Appl. No.: 12/119,545

(22) Filed: May 13, 2008

(65) Prior Publication Data
US 2009/0158254 A1   Jun. 18, 2009

(30) Foreign Application Priority Data
Dec. 13, 2007   (TW) ................................ 96147623 A

(51) Int. Cl.
*G06F 9/44* (2006.01)
(52) U.S. Cl. ........................................ 717/123; 717/124

(58) Field of Classification Search ........... 717/124–135
See application file for complete search history.

(56) References Cited

U.S. PATENT DOCUMENTS

| | | | |
|---|---|---|---|
| 4,336,754 A * | 6/1982 | Loeb ............................. 101/127 |
| 5,926,812 A | 7/1999 | Hilsenrath et al. |
| 6,338,060 B1 | 1/2002 | Washizawa |
| 6,728,720 B1 * | 4/2004 | Lenzie ................................. 1/1 |
| 7,010,515 B2 | 3/2006 | Nakano |
| 2002/0059240 A1 * | 5/2002 | Hollenbeck et al. ............... 707/9 |
| 2003/0115129 A1 * | 6/2003 | Feaver et al. ..................... 705/37 |
| 2005/0081109 A1 * | 4/2005 | Czerwonka ....................... 714/38 |
| 2005/0289437 A1 * | 12/2005 | Oh et al. ......................... 714/758 |
| 2008/0028364 A1 * | 1/2008 | Triou et al. .................... 717/104 |
| 2008/0085763 A1 * | 4/2008 | Randhawa ....................... 463/25 |

\* cited by examiner

*Primary Examiner* — Hung T Vy
*Assistant Examiner* — Mongbao Nguyen
(74) *Attorney, Agent, or Firm* — Ming Chow; Sinorica, LLC

(57) ABSTRACT

The present invention discloses an automatic method and system for generating and filtering out the innovation proposals. Particularly, it is about a system, which generates all the possible element code sets, compares them to the code sets of existing objects or documents, and then filters out the novel element code sets. The system comprises a standard element depository, a permutation and combination module, a testing object processing module, a matching module, a sifting module, and an output module.

9 Claims, 3 Drawing Sheets

AUTOMATIC CREATIVE PROPOSAL GENERATING AND FILTERING SYSTEM AND MANUFACTURING METHOD THEREOF AND MULTIPLE COMPONENTS COMBINING METHOD

BACKGROUND OF THE INVENTION

1. Technical Field

The present invention relates to a method and system for generating and filtering out creative proposals. More particularly, the present invention relates to a method for automatically generating all the possible element code sets, comparing them to the code sets of existing objects or documents, and then filtering out the novel element code sets, and a system corresponding to the method.

2. Description of Related Art

In the modern technique-intensive industries, RD has become an indispensable segment in all enterprises and the achievement of their researches and developments are generally protected by filing patent applications thereof. Some enterprises, such as Tessera Technologies Inc. in the US and Semiconductor Energy Laboratory (SEL) in Japan, who both have considerable sums of patents or patent applications, have even dismissed their production lines for only remaining RD staff to proceed with the advanced development on their specialties so as to continuously increase the amount of their patents or patent applications. However, it would be a real challenge to effectively manage disclosure concerning increasing innovative products and patents proposing novel technologies so as to transcend competitors by rapidly originating novel inventions and designs. Besides, in the technique-intensive industries where technologies vary from minute to minute, such as semiconductor process, semiconductor packaging or digital systems, there are numerous and promptly increasing inventions and patents. Therefore, a need exists for an approach to efficiently originate novel inventions and designs while ensuring the patantability of these inventions and designs.

In view of the aforementioned problems and need, the present invention proposes a method for automatically generating all the possible element code sets, comparing them to the code sets of existing objects or documents, and then filtering out the novel element code sets, and a system corresponding to the method.

SUMMARY OF THE INVENTION

For satisfying the above need, it is the primary objective of the present invention to provide a method for automatically generating all the possible element code sets and comparing them to the code sets of existing objects or documents so as to rapidly filter out the novel element code sets, and a system corresponding to the method, thereby accelerating RD achievements and innovation.

Another objective of the present invention is to provide a method for rapidly generating and filtering out the novel element code sets, wherein the novel element code sets are not found in the prior arts and superior to the prior arts in novelty.

To achieve the above objects, the present invention provides an automatic creative proposal generating and filtering system, which comprises a standard element depository, a permutation and combination module, a testing object processing module, a matching module, a sifting module, and an output module. Therein, the standard element depository defines and stores a plurality of elements with standard element codes, in which each said standard element comprises at least one feature and each said feature has an identification code (Z) corresponding thereto. The permutation and combination module permutes and combines the identification codes (Z) pertaining to one said standard element (X) in the standard element depository so as to form a plurality of featured elements (Xi), which are then permuted and combined to define all possible combinations of the featured elements (Xi) as featured element code sets that are afterward collected and stored in a featured element code sets storing module. The testing object processing module defines and store elements of a testing object by using the corresponding standard elements (X) and identification codes (Z) in the standard element depository as a testing object code set, which is then permuted and combined to generate a testing object code set of partial features. The matching module matches the code sets in the featured element code sets storing module with the code sets in the testing object processing module. The sifting module sifts matching results of the matching module to filter out a first code set portfolio that exists in both the featured element code sets storing module and the testing object processing module and to filter out a second code set portfolio that only exists in the featured element code sets storing module and does not exist in the testing object processing module. The output module outputs a sifting result that includes the first code set portfolio and the second code set portfolio, wherein the code sets represented by the second code set portfolio are novel code sets that have not been disclosed by the testing object and may be used as a reference for a creative proposal.

The present invention further provides a multiple components combining method, which comprises: providing a database that contains a plurality of standard elements and serves to define and store the plural elements by using standard element codes, wherein, each said standard element comprises at least one feature and each said feature has at least one identification code (Z) corresponding thereto; providing a permutation and combination process to permute and combine the identification codes (Z) pertaining to one said standard element in the standard element depository so as to form a plurality of featured elements (Xi), which are then permuted and combined to get all possible combinations of the featured elements (Xi) as featured element code sets that are afterward collected and stored as a featured element code sets database that contains all possible combinations of the elements.

The present invention further provides an automatic creative proposal generating and filtering method, which comprises: providing a standard element database containing a plurality of standard elements; providing a permutation and combination process; providing a testing objects database; providing a matching process; providing a sifting process; and providing an output process. Therein, for providing the standard element database containing the standard elements, a plurality elements are defined and stored by using standard element codes, wherein each said standard element comprises at least one feature and each said feature has an identification code (Z) corresponding thereto. In the permutation and combination process, the identification codes (Z) pertaining to one said standard element (X) in the standard element depository are permuted and combined so as to form a plurality of featured elements (Xi), which are then permuted and combined to get all possible combinations of the featured elements (Xi) as featured element code sets that are afterward collected and stored as a featured element code sets database. For providing the testing objects database that contains a plurality of testing objects, elements of each said testing object are defined by using the corresponding standard elements (X) and identification codes (Z) in the standard element depository and stored as a testing object code set, which is then permuted and combined to generate all possible testing object code sets of partial features. In the sifting process, matching results of the matching process are sifted to filter out a first code set portfolio that exists in both the featured element code sets database and the testing objects database and to filter out a second code set portfolio that only exists in the featured element code sets database and does not exist in the testing objects database, wherein the code sets represented by the second code set portfolio are novel code sets that have not been disclosed by the testing object and may be used as a reference for a creative proposal.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

While the present invention discloses an automatic creative proposal generating and filtering system and manufacturing method thereof, some of the implemented technologies, such as databases and storing module used therein are well known in the art and need not be discussed at length herein. Furthermore, the accompany drawings attached herewith are for illustrating features in connection with the present invention only.

Figure 1:
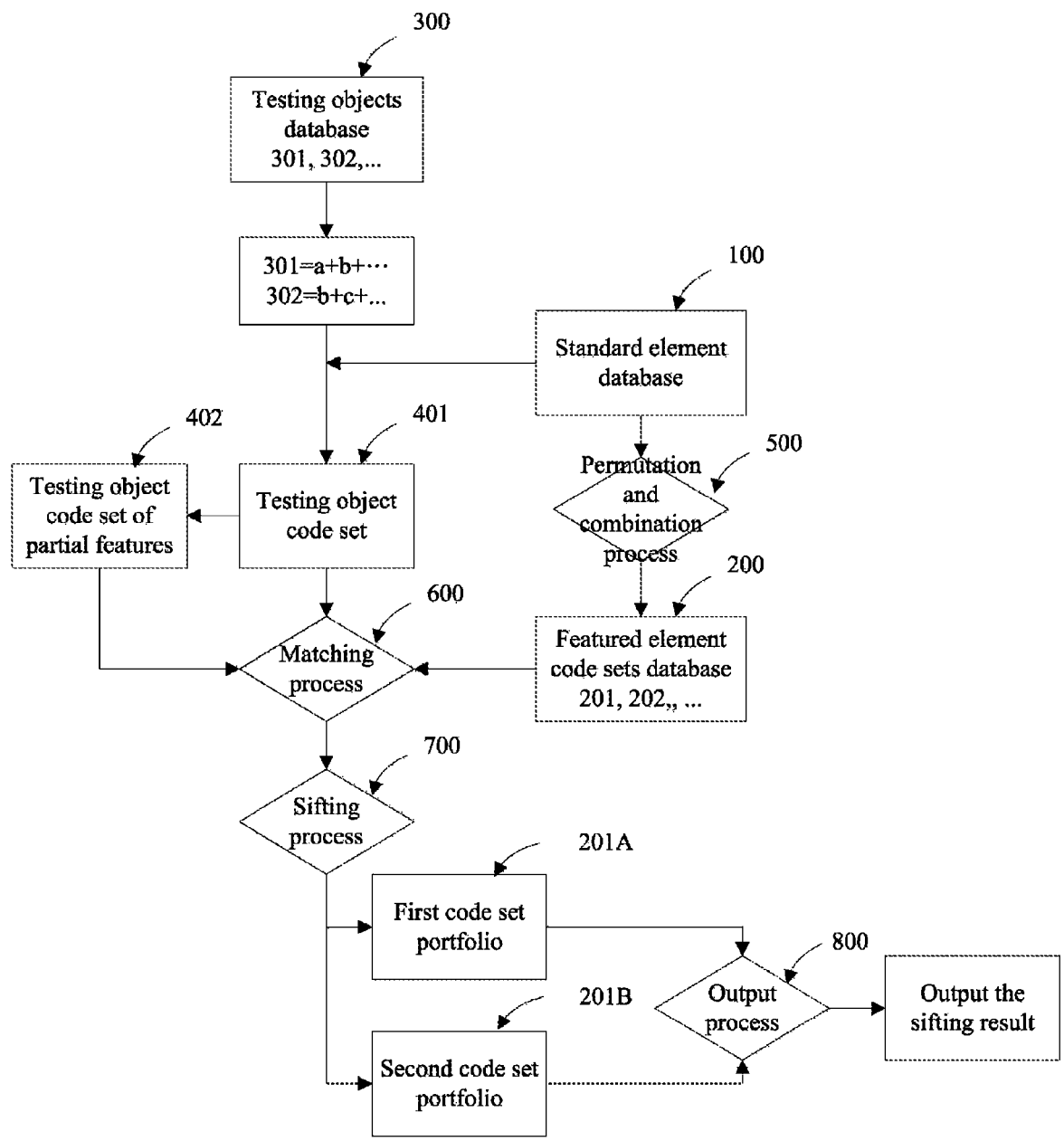
FIG. 1 is a flow chart of an automatic creative proposal generating and filtering method according to a first embodiment the present invention.

Please refer to FIG. 1 for a flow chart of an automatic creative proposal generating and filtering method according to a first embodiment the present invention. Firstly, a standard element database 100 is built. The standard element database 100 contains a plurality of standard elements (X), wherein X=A, B, C, D . . . . Each said standard element is defined as at least one featured element (Xi) according to its distinctive feature. For describing the featured element (Xi) in a standardized manner, major features (Xj, k . . . ) contained in or related to the standard elements and eigenvalues corresponding to the features are further defined, wherein each said eigenvalue has an identification code (Z) corresponding thereto, thereby achieving a standardized feature defining system, wherein Z is an integer or a symbol. After the featured element (Xi) are analyzed regarding features thereof, selected identification code (zj) is substituted into the major feature (j) so as to establish a feature code of the elements in a form of Xzj,zk . . . . For example, A1=$A_{11}$. The standardized feature defining and coding system is used as a basis for converting elements into codes.

Then, a permutation and combination process 500 is provided for substituting various identification codes (zj,zk . . . ) into each of the features (Xj,k . . . ), respectively, so as to generate all possible combinations of the feature codes (Xzj, zk . . . ) of the elements so as to form a plurality of featured elements (Xi), wherein X=A, B, C, D . . . and i is an integer. After that, the plural featured elements (Xi) are processed by the permutation and combination process 500 to find out all possible featured element code sets 201. For example, when 201=A1+B2+C1, if A1=$A_{11}$, B2=$B_{12}$ and C1=$C_{11}$, it can be further defined that 201=$A_{11}$+$B_{12}$+$C_{11}$. The featured element code sets 201 are stored as a featured element code sets database 200 that contains all the possible featured elements (Xi) derived by permuting and combining the standard elements (X) and the identification codes (Z) in the standard element database 100 and all the possible featured element code sets 201 derived by permuting and combining the featured elements.

Next, a testing objects database 300 is provided. Testing objects 301 stored in the database may be any public information collected by an enterprise and may be an article having a substantiality, a photo of an article having a substantiality, a diagram of an article, a design chart or a patent specification. The testing object 301 may also be one or a combination of the items recited above. After the testing objects database 300 is established, each said testing object 301 is analyzed regarding elements and features thereof. The elements of the testing objects 301 are converted into testing object code sets 401 by either a manual operation or an automatic conversion so as to find out the code sets having less novelty as compared with the testing object code sets 401, namely a testing object code set of partial features 402 composed of part of the elements of the testing object code sets 401. Steps for converting the elements of the testing object 301 into the testing object code sets 401 are described below. Each said testing object 301 is composed of at least one element (Y), wherein Y=a, b, c, d . . . . Assuming that the testing object 301 is composed of elements a, b and c, the testing object 301 can be expressed as 301=a+b+c. Then the elements of the testing object 301 are matched with the standard elements (X) in the standard element database 100 so as to identify the standard element codes corresponding to the elements of the testing object 301. For example, when the elements a, b and c are corresponding to the standard elements A, B and C, respectively, after the aforementioned conversion, it can be concluded that 301=$A_{jk}$+$B_{jk}$+$C_{jk}$, wherein the suffixes j and k represent identification codes that are defined according to the identification codes (Z) in the standard element database 100 through the analyses of the elements. If it is found that $A_{jk}$=$A_{11}$, $B_{jk}$=$B_{12}$ and $C_{jk}$=$C_{11}$ through the analyses of the elements of the testing object 301 from regarding its features, the testing object 301, which is converted according to the testing object code sets 401, can be described as 401=$A_{11}$+$B_{12}$+$C_{11}$. Then, to identify the code sets that are less novel as compared with the testing object code sets 401, part of the elements in the testing object code sets 401 are taken out and further permutation as well as combination are conducted. For example, in the testing object code set 401=$A_{11}$+$B_{12}$+$C_{11}$, one of the elements $C_{11}$ is taken out to form a partial code set 402a=$A_{11}$+$B_{12}$, or, alternatively, two of the elements $A_{11}$ and $C_{11}$ are taken out to form another partial code set 402b=$B_{12}$, and so forth. Thereby, a testing object code set of partial features 402 containing all possible combinations of the elements in the testing object code sets 401 can be derived. The testing object code sets 401 and the testing object code set of partial features 402 are both stored in the testing objects database 300.

After the featured element code sets database 200 is established, and the testing object code sets 401 and the testing object code set of partial features 402 in the testing objects database 300 are converted and combined, since the featured element code set 201 and the testing object code set 401 as well as the testing object code set of partial features 402 are all defined according to the standard elements (X) and identification codes (Z) in the standard element database 100, when there is a said element existing in both, this element in the both code sets is defined as an identical said identification code (Z), so that a comparison between the both code sets is possible. Further, matching process 600 is provided for matching the featured element code sets 201 with the testing object code sets 401 and the testing object code set of partial features 402 in the testing objects database 300. The matching process 600 may comprise a sequential matching process or a parallel matching process.

Then a sifting process 700 is provided for sifting the code sets having novelty through the following steps. If one said code set exists in the featured element code sets database 200, and also exists in the testing objects database 300, it is verified that the elements and features represented by this very code set have been used in some prior disclosure and lack novelty. Then these elements and features are converged as a first code set portfolio 201A. If one said code set exists in the featured element code sets database 200, and does not exists in the testing objects database 300, it is verified that the elements and features represented by this very code set have not been disclosed by any prior art recognized by this enterprise. In other words, these elements and features may have novelty and can be used as a reference for a creative proposal. Then these elements and features are converged as a second code set portfolio 201B. However, further investigation or professional evaluation may be necessary to confirm whether these elements and features have not been disclosed in any public information and whether these elements and features satisfy the criteria of non-obviousness and industrial applicability. At last, the matching and sifting results, including the first code set portfolio 201A and second code set portfolio 201B are output through an output process 800 so as to accomplish the automatic creative proposal generating and filtering method of the present invention.

Figure 2:
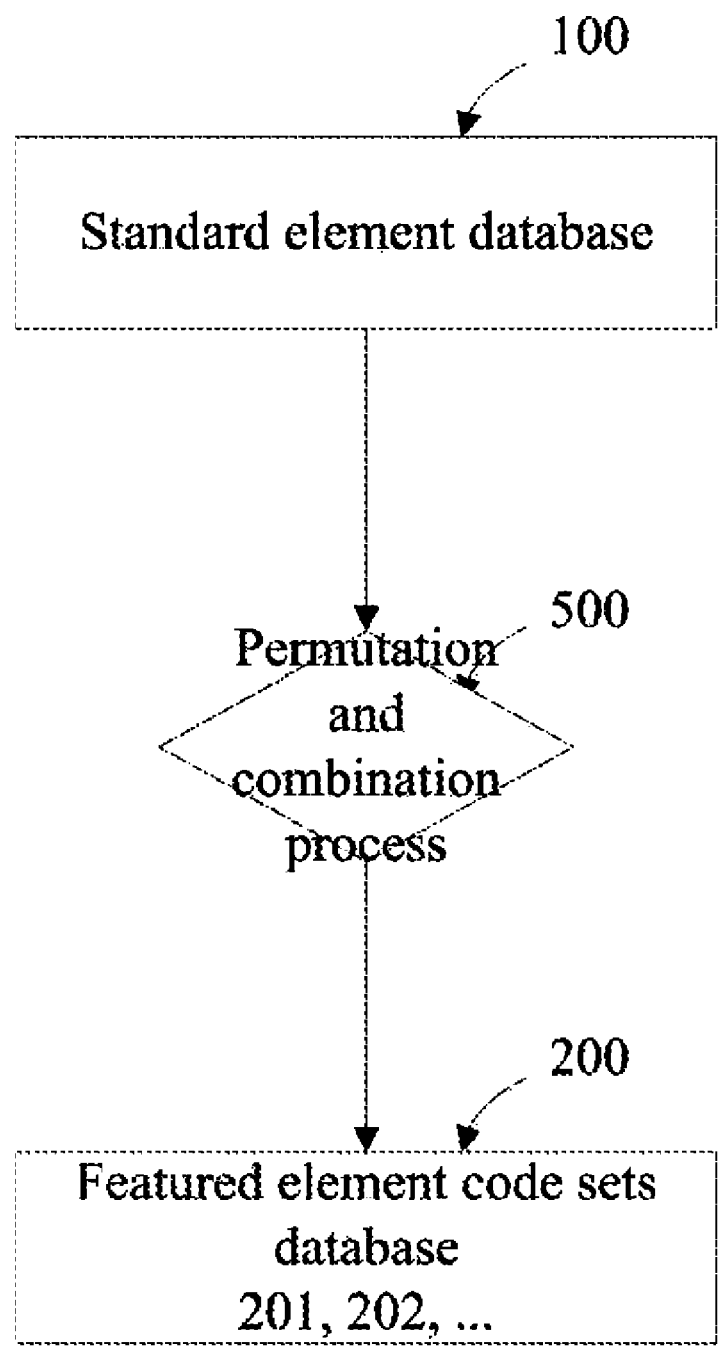
FIG. 2 is a flow chart of a multiple components combining method according to a second embodiment the present invention.

Now referring to FIG. 2, in a second embodiment of the present invention, a multiple components combining method, namely a forming method for the foregoing featured element code sets database 200, is provided and comprising:

providing a standard element database 100, which defines and stores a plurality of elements by using standard element codes, wherein, each said standard element comprises at least one feature and each said feature has an identification code (Z) corresponding thereto;

providing a permutation and combination process 500 to permute and combine the identification codes (Z) pertaining to one said standard element (X) in the standard element database 100 so as to form a plurality of featured elements (Xi), which have their identification codes expressed as in a form of Xzj, zk . . . and are then further permuted and combined to get all possible combinations of the featured elements (Xi) as a plurality of featured element code sets 201; and storing the plural featured element code sets 201 as a featured element code sets database 200 that contains all the possible combinations of the elements.

Figure 3:
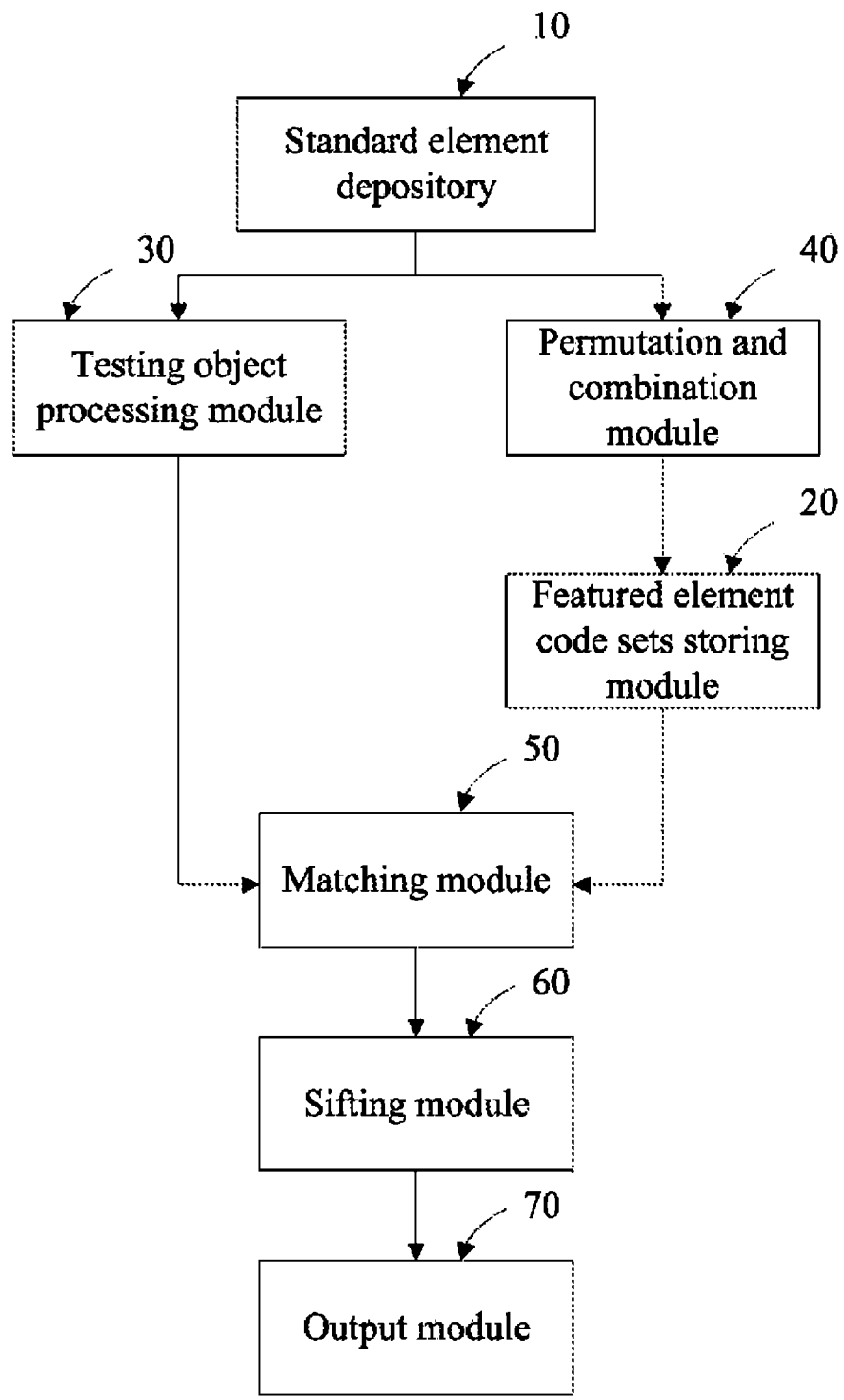
FIG. 3 is a block diagram of an automatic creative proposal generating and filtering system according to a third embodiment the present invention.

The present invention further provides a third embodiment, wherein an automatic creative proposal generating and filtering system as shown in FIG. 3 is provided. The disclosed system comprises:

a standard element depository 10, for defining and storing a plurality of elements by using standard element codes, in which each said standard element comprises at least one feature and each said feature has an identification code (Z) corresponding thereto;

a permutation and combination module 40, for permuting and combining the identification codes (Z) pertaining to one said standard element (X) in the standard element depository so as to form a plurality of featured elements (Xi), which have their identification codes (Z) expressed in a form of Xzj, zk . . . and are then further permuted and combined to identify all possible combinations of the featured elements (Xi) as featured element code sets 201 that are afterward collected and stored in a featured element code sets storing module 20;

a testing object processing module 30, for defining elements of a testing object by using the corresponding standard elements (X) and identification codes (Z) in the standard element depository 10 to be stored as a testing object code set 401, in which testing object code set 401 elements are permuted and combined to identified all possible testing object code sets of partial features 402 to be saved, wherein the testing object may be manually or automatically converted into the code sets and the testing object may be any kind of public information such as an article having a substantiality, a photo of an article having a substantiality, a diagram of an article, a design chart or a patent specification or a combination of the above;

a matching module 50, for matching the featured element code sets 201 in the featured element code sets storing module 20 with the testing object code sets 401 and the testing object code sets of partial features 402 in the testing object processing module 30, wherein a matching process of the matching module 50 comprises a sequential matching process or a parallel matching process; a sifting module 60, for sifting matching results of the matching module to filter out a first code set portfolio 201A that exists in both the featured element code sets storing module 20 and the testing object processing module 30 and to filter out a second code set portfolio 201B that only exists in the featured element code sets storing module 20 and does not exist in the testing object processing module 30; and an output module 70, for outputting a sifting result that includes the first code set portfolio 201A and the second code set portfolio 201B, wherein the code sets represented by the second code set portfolio 201B are novel code sets that have not been disclosed in the testing object and may be used as a reference for a creative proposal.

Although the particular embodiments of the invention have been described in detail for purposes of illustration, it will be understood by one of ordinary skill in the art that numerous variations will be possible to the disclosed embodiments without going outside the scope of the invention as disclosed in the claims and the equivalents.

What is claimed is:

1. An automatic creative proposal generating and filtering method, primarily comprising steps of:

providing a standard element database that contains a plurality of standard elements (X), wherein each said standard element comprises at least one feature and each said feature has an identification code (Z) corresponding thereto;

providing a permutation and combination process, for permuting and combining the identification codes (Z) pertaining to one said standard element (X) in the standard element depository so as to form a plurality of featured elements ($X_i$), which are then further permuted and combined to identify all possible combinations of the featured elements ($X_i$) as featured element code sets that are afterward collected and stored as a featured element code sets database;

providing a testing object database that contains a plurality of testing objects, wherein each said testing object is analyzed regarding elements thereof to identify at least one element (Y) contained therein and is then analyzed regarding featured thereof to be converted into a testing object code set by using the corresponding identification codes (Z), in which elements of the testing object are permuted and combined to generate at least one testing object code set of partial features;

providing a matching process, for matching each said featured element code set in the featured element code sets database with each said testing object code set and testing object code set of partial feature in the testing object database;

providing a sifting process, for sifting a first code set portfolio that exists in both the featured element code sets database and the testing object database and for sifting a second code set portfolio that only exists in the featured element code sets database and does not exist in the testing objects database, wherein the second code set portfolio is the creative proposal that have not been disclosed in the testing objects database; and providing an output process, for outputting a sifting result of the sifting process.

2. The automatic creative proposal generating and filtering method of claim 1, wherein, the sifting result output by the output process is the second code set portfolio.

3. The automatic creative proposal generating and filtering method of claim 1, wherein, the sifting result output by the output process is the first code set portfolio.

4. The automatic creative proposal generating and filtering method of claim 1, wherein, the testing object may be any public information.

5. The automatic creative proposal generating and filtering method of claim 1, wherein, the testing object is one of or a combination of any of an article having a substantially, a photo of an article having a substantially, a diagram of an article, a design chart and a patent specification.

6. The automatic creative proposal generating and filtering method of claim 1, wherein, the featured element ($X_i$) formed by the permutation and combination process is a combination of one said standard element (X) and at least one said feature while the identification code is defined as $X_{zj, zk}$ . . . .

7. The automatic creative proposal generating and filtering method of claim 1, wherein, the matching process comprises a sequential matching process or a parallel matching process.

8. The automatic creative proposal generating and filtering method of claim 1, wherein, the testing object is manually converted to the testing object code set.

9. The automatic creative proposal generating and filtering method of claim 1, wherein, the testing object is automatically converted to the testing object code set.

* * * * *